(12) United States Patent
Honda

(10) Patent No.: US 11,678,052 B2
(45) Date of Patent: Jun. 13, 2023

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Hirofumi Honda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/351,947

(22) Filed: Jun. 18, 2021

(65) Prior Publication Data
US 2021/0409586 A1   Dec. 30, 2021

(30) Foreign Application Priority Data

Jun. 24, 2020   (JP) .............................. JP2020-109031

(51) Int. Cl.
*H04N 23/68*        (2023.01)
*H04N 23/663*       (2023.01)

(52) U.S. Cl.
CPC ......... *H04N 23/684* (2023.01); *H04N 23/663* (2023.01); *H04N 23/685* (2023.01); *H04N 23/687* (2023.01); *H04N 23/6812* (2023.01)

(58) Field of Classification Search
CPC ............. H04N 5/2327; H04N 5/23209; H04N 5/23258
See application file for complete search history.

(56) References Cited

U.S. PATENT DOCUMENTS 8,432,454 B2 * 4/2013 Miyasako ................ G03B 5/02
                                                         348/208.5
8,786,743 B2 * 7/2014 Asukabe ................ H04N 23/73
                                                         348/296

FOREIGN PATENT DOCUMENTS

| JP | 2011-135537 A | 7/2011 |
| JP | 2011-139167 A | 7/2011 |
| JP | 2018-072540 A | 5/2018 |

* cited by examiner

*Primary Examiner* — Twyler L Haskins
*Assistant Examiner* — Angel L Garces-Rivera
(74) *Attorney, Agent, or Firm* — Canon U.S.A., Inc. IP Division

(57) ABSTRACT

A control apparatus includes an acquisition unit configured to acquire information on an optical image stabilization performance, and a correction unit configure to provide an electronic image stabilization. The correction unit changes a gain of the correction unit based on information on a shutter speed and information on the image stabilization performance.

21 Claims, 8 Drawing Sheets

CONTROL APPARATUS, IMAGE PICKUP APPARATUS, CONTROL METHOD, AND STORAGE MEDIUM

BACKGROUND OF THE DISCLOSURE

Field of the Disclosure

The aspect of the embodiments relates to a control apparatus and an image pickup apparatus, each of which provides an image stabilization.

Description of the Related Art

There has conventionally been known an image pickup apparatus that provides an image stabilization ("IS") by an electronic image stabilization ("EIS") method. However, when the IS made by the EIS method at a low shutter speed, a blur (accumulated blur) occurs during the exposure time since the exposure time is long. This accumulated blur cannot be corrected by the EIS method.

Japanese Patent Laid-Open No. ("JP") 2011-135537 discloses an EIS method that reduces influence of an accumulated blur by attenuating an IS signal when the shutter speed is low. JP 2011-139167 discloses a method of reducing influence of an accumulated blur by applying a more weight for a distribution ratio of a camera shake detection amount supplied to an optical image stabilization ("OIS") method and an EIS method to the OIS method side as the shutter speed is lower. JP 2018-72540 discloses a method of reducing influence of an accumulated blur by increasing a correction gain of the OIS method and by decreasing a correction gain of the EIS method when the shutter speed is low.

Each of the methods disclosed in JPs 2011-135537, 2011-139167, and 2018-72540 reduces the influence of the accumulated blur by suppressing the correction effect of the EIS method based on the shutter speed. Therefore, each method cannot maintain the sufficient correction effect of the EIS method at a low shutter speed.

SUMMARY OF THE DISCLOSURE

A control apparatus according to one aspect of the embodiments includes at least one processor; and a memory coupled to the at least one processor, the memory having instructions that, when executed by the at least one processor, performs operation as: an acquisition unit configured to acquire information on a stabilization performance, and a correction unit configure to provide an image stabilization. The correction unit changes a gain of the correction unit based on information on a shutter speed and information on the stabilization performance.

An image pickup apparatus having the above control apparatus or a control method corresponding to the above control apparatus also constitute another aspect of the embodiments.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

First Embodiment

Figure 1:
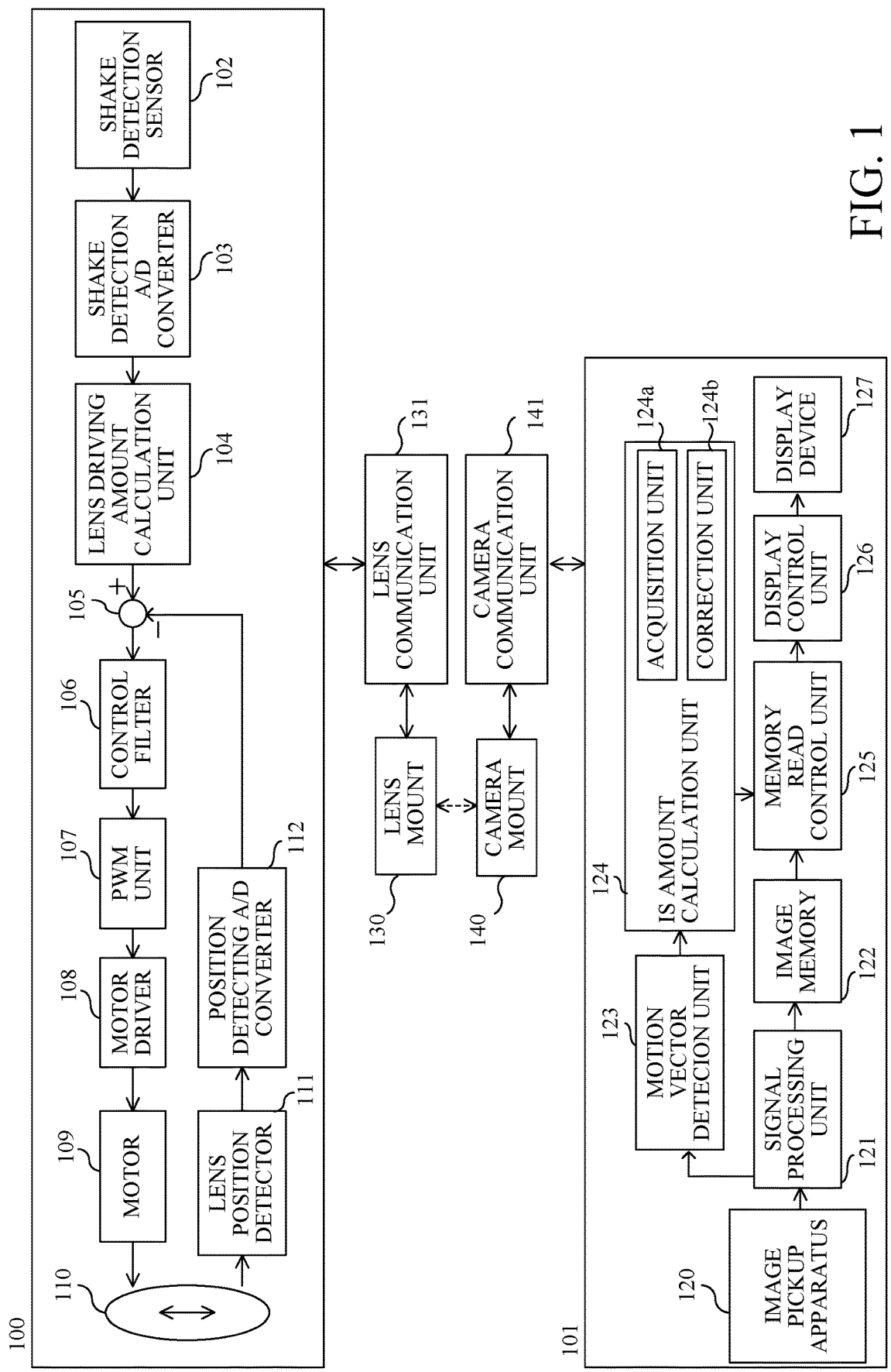
FIG. 1 is a block diagram of an image pickup apparatus according to a first embodiment.

Referring now to FIG. 1, a description will be given of a configuration and operation of an image pickup apparatus according to a first embodiment of the disclosure. FIG. 1 is a block diagram of an image pickup apparatus (video camera) 10 according to this embodiment. The image pickup apparatus 10 includes a camera body 101 and a lens unit 100 that is attachable to and detachable from the camera body 101. However, this embodiment is not limited to this example, and is applicable to an image pickup apparatus in which the camera body and the lens unit are integrated with each other.

The lens unit 100 is connected to the camera body 101 via a lens mount 130 and a camera mount 140. The lens mount 130 and the camera mount 140 each have an electrical connection terminal, and can communicate data between the lens unit 100 and the camera body 101 via a lens communication unit 131 and a camera communication unit (communication unit) 141.

A description will now be given of an optical image stabilization (OIS) performed by the lens unit 100. A shake detection sensor (shake detection unit) 102 detects vertical and horizontal blurs applied to the lens unit 100 as an angular velocity signal, and supplies the angular velocity signal to a shake detection A/D converter 103. The shake detection A/D converter 103 digitizes the angular velocity signal from the shake detection sensor 102 and supplies it to a lens driving amount calculation unit 104. Hereinafter, an output of the shake detection A/D converter 103 will be defined as angular velocity data.

The lens driving amount calculation unit 104 calculates a driving amount for driving a correction optical system 110 based on the angular velocity data, and supplies it to a subtractor 105. The subtractor 105 subtracts position data from the output of the lens driving amount calculation unit 104, and supplies resulting deviation data to a control filter 106. The position data is data made by A/D-converting the output of a lens position detector 111 that detects a position of the correction optical system 110 by a position detecting A/D converter 112. The control filter 106 includes an amplifier that amplifies input data with a predetermined gain, and a phase compensation filter. The deviation data supplied from the subtractor 105 is output to a pulse width modulation ("PWM") unit 107 after receiving signal processing by the amplifier and the phase compensation filter in the control filter 106.

The PWM unit 107 modulates the data supplied through the control filter 106 into a waveform (PWM waveform) that changes a duty ratio of a pulsed wave, and supplies the data to a motor driver 108. A motor 109 is a voice coil type motor configured to drive the correction optical system 110 and driven by the motor driver 108, and the correction optical system 110 is moved in a direction orthogonal to the optical axis. The lens position detector 111 includes a magnet and a Hall sensor provided at a position facing the magnet, detects a moving amount of the correction optical system 110 in the direction orthogonal to the optical axis, and supplies the detection result to the subtractor 105 via the position detecting A/D converter 112. Thereby, a feedback control system is configured in which the moving amount of the correction optical system 110 in the direction orthogonal to the optical axis is made to follow the output of the lens driving amount calculation unit 104.

The correction optical system 110 is, for example, a shift lens, which is an image stabilization (IS) optical system that deflects the optical axis by moving on a plane orthogonal to the optical axis. As a result of the movement of the correction optical system 110, an image in which vertical and horizontal blurs of the object on the imaging plane caused by shakes of the lens unit 100 have been corrected is formed on the image sensor 120 which is a component of the camera body 101.

A description will now be given of an electronic image stabilization ("EIS") performed by the camera body 101. An image sensor 120 is a photoelectric conversion element such as a CMOS sensor or a CCD sensor, converts an object image formed by an imaging optical system (not shown) including the correction optical system 110 into an electric signal as a captured image signal, and supplies it to a signal processing unit 121. The signal processing unit 121 generates, for example, a video signal conforming to the NTSC format from the signal obtained by the image sensor 120 and supplies it to an image memory 122 and a motion vector detection unit 123.

An image stabilization (IS) amount calculation unit (control apparatus) 124 calculates an image read position for correcting a blur in the captured image based on the motion vector detected by the motion vector detection unit 123 described later, and sets a calculated read position to a memory read control unit 125. The IS amount calculation unit 124 includes an acquisition unit 124a configured to acquire information on the OIS performance and a shutter speed and a correction unit 124b configured to provide the EIS. The correction unit 124b provides the EIS by adjusting the read range of the image output from the image sensor 120. The correction unit 124b changes the gain (EIS gain) of the correction unit 124b based on information on a shutter speed and information on the IS performance. The processing of the IS amount calculation unit 124 will be described in detail later.

The memory read control unit 125 corrects blurs in the captured image by correcting the read position of the image stored in the image memory 122 based on the read position information calculated by the IS amount calculation unit 124. A display control unit 126 outputs the video signal supplied from the memory read control unit 125 and causes a display device 127 to display an image. The display control unit 126 drives the display device 127, and the display device 127 displays an image by a liquid crystal display element (LCD) or the like. The motion vector detection unit 123 detects a motion vector in an image based on a luminance signal included in the current video signal generated by the signal processing unit 121 and a luminance signal included in the video signal one field before (or one frame before) which is stored in the image memory 122.

A motion vector detecting method can use, for example, a known block matching method or the like. The block matching method is a method that divides an captured image into an area called a block, and detects, for example, a similar portion in the block unit between the captured image one frame before and the current captured image. In an arbitrary range in the captured image one frame before, a position having the largest correlation value with the arbitrary block in the current captured image is positioned as a similar block. A displacement amount between an arbitrary block position in the current captured image and a similar block position in the captured image one frame before is obtained, and motion information between frames of the captured image, that is, a motion vector is detected. The block matching method is an illustrative motion vector detecting method in the motion vector detection unit 123, and the motion vector detecting method may be a method other than the block matching method.

A detailed description will now be given of an IS effect at a low shutter speed. In capturing a motion image, it is generally said that the smoothest motion image can be obtained by setting the shutter speed to be the same as the frame rate. In the shutter speed range slower than this shutter speed, a blur (accumulation blur) stands out during the accumulation period. Here, the OIS by the correction optical system 110 corrects the blur so that the object light incident on the image sensor 120 is always at the same position on the imaging plane, and therefore the blur can be corrected during the accumulation time.

On the other hand, the shake detection sensor 102 using the angular velocity sensor of the vibration gyro can accurately detect a high frequency band component of the blur applied to the apparatus, but the detection characteristic deteriorates in the low frequency band of 1 Hz or less. Therefore, in such a low frequency band, the blur remains due to correction error, and a sufficient IS effect may not be obtained. Accordingly, in addition to the shake detection sensor 102, the motion vector detection unit 123 is further provided to detect the residual blur in the low frequency band that cannot be detected by the shake detection sensor 102, and this is to be corrected by the EIS so as to improve the IS effect.

However, as described above, the accumulated blur at a low shutter speed cannot be corrected by the EIS method. Thus, when the object position is corrected by the EIS, the accumulated blur component remains and as a result, the object blurs unsteadily. To avoid this situation, it is conceivable to weaken the EIS effect at a low shutter speed. If the lens can provide the IS satisfactorily by the OIS method, the accumulated blur is unlikely to occur, so it is unnecessary to weaken the correction effect of the EIS.

Accordingly, this embodiment determines the correction effect of the EIS method performed by the camera body 101 in accordance with the correction performance of the OIS method of the lens unit 100 attached to the camera body 101. Thereby, a larger IS effect can be obtained.

First, the correction performance of the OIS will be described. As is well known, a blur amount in a captured image relates to the shutter speed. Accordingly, the number of stages of the shutter speed on the low-speed side that can maintain the correction performance of the OIS is widely used as an index (number of correction stages) that indicates the IS performance (OIS performance).

Figure 2:
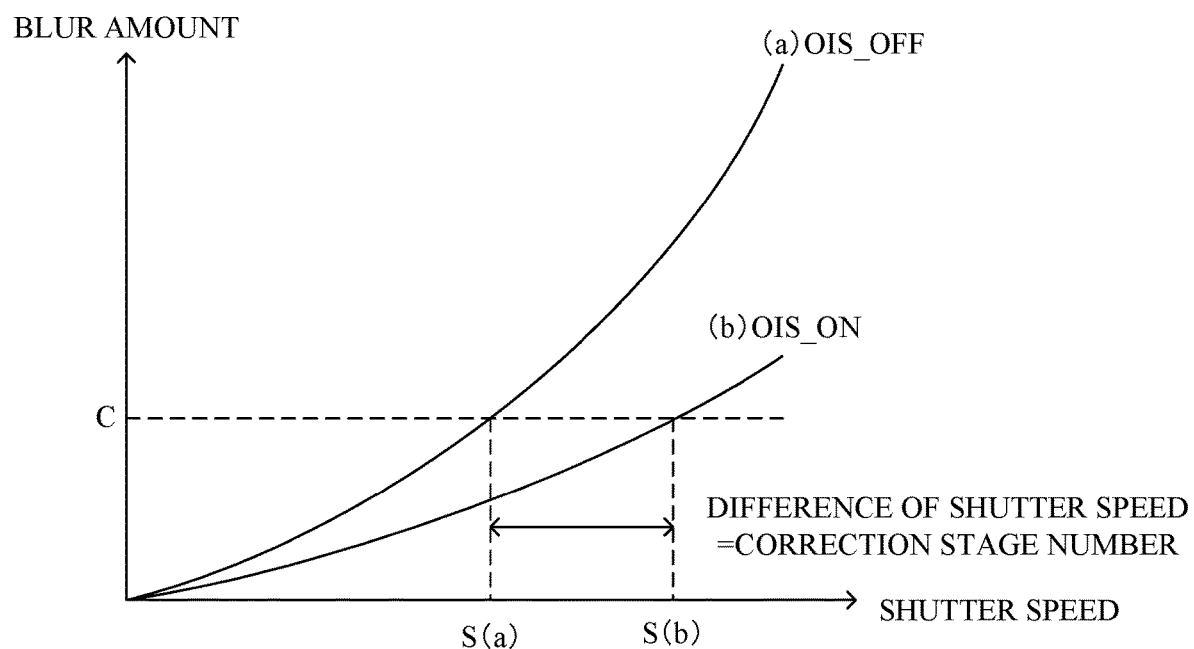
FIG. 2 illustrates a relationship between a shutter speed and a blur amount in a captured image in the first embodiment.

FIG. 2 shows a relationship between the shutter speed and the blur amount in the captured image when the OIS by the correction optical system 110 is turned off ((a) OIS_OFF) and on ((b) OIS_ON). In FIG. 2, the abscissa axis represents the shutter speed and the ordinate axis represents the blur amount. For a reference blur amount C, (a) OIS_OFF and (b) OIS_ON indicate corresponding shutter speeds S(a) and S(b), respectively, and it can be seen that there is a difference in shutter speed. That is, the IS performance can be expressed by the number of stages corresponding to this difference in shutter speed.

Figure 3:
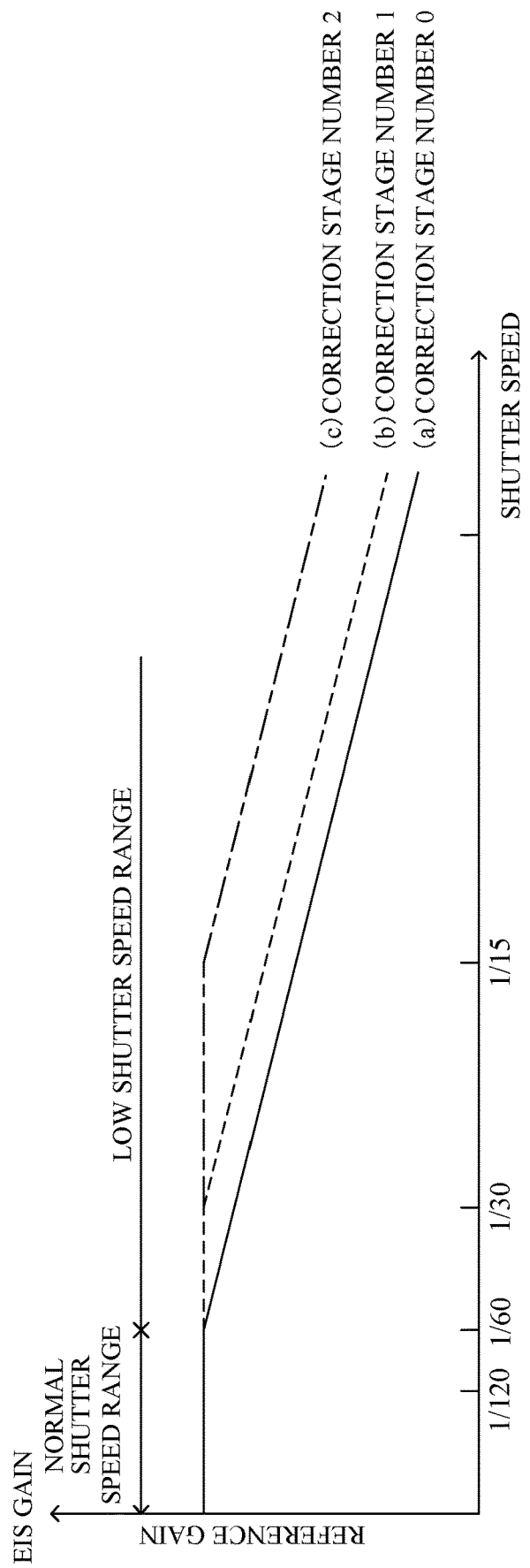
FIG. 3 illustrates a relationship between the shutter speed and an EIS gain in the first embodiment.

FIG. 3 illustrates a relationship between the shutter speed and the correction gain (EIS gain) of the EIS relative to the correction stage number information acquired from the lens unit 100. In FIG. 3, the abscissa axis represents the shutter speed and the ordinate axis represents the EIS gain. In FIG. 3, a frame rate is set to 60 P, a reference shutter speed is set to 1/60 seconds, and a shutter speed slower than a shutter speed 1/60 seconds is set to a low shutter speed range.

As mentioned above, the accumulated blur at a low shutter speed cannot be corrected by the EIS method. Thus, when the object position is corrected by the EIS, the blur component generated between the frames is corrected, but the accumulated blur component remains, and as a result, the object blurs. In order to avoid this situation, as illustrated by a solid line (a) in FIG. 3, in the low shutter speed range, the gain (EIS gain) of the EIS is lowered from the reference gain (which is a gain in a normal shutter speed range higher than the shutter speed of 1/60 seconds). By lowering the EIS gain, the correction effect is weakened and the blur can be made inconspicuous. Here, the correction stage number 0 is assumed to have no correction effect of the OIS. In this case, the EIS gain is lowered at a shutter speed of 1/60 seconds or less, which is the low shutter speed range.

A broken line (b) in FIG. 3 illustrates the setting of the EIS gain when the lens unit 100 including the correction optical system 110 having the correction stage number 1 is attached. The blur amount at the shutter speed (1/60 seconds) when the number of correction stages is 0 and the blur amount at the shutter speed (1/30 seconds) when the number of correction stages is 1 are equivalent with each other. Until the shutter speed becomes 1/30 seconds, the influence of the accumulated blur is so small that the EIS gain is not lowered from the reference gain. Thereby, the IS effect of the EIS can be maintained in a wider range.

An alternate long and short dash line (c) in FIG. 3 illustrates the setting of the EIS gain when the lens unit 100 including the correction optical system 110 having the number of correction stages of 2 is attached. The blur amount at the shutter speed (1/60 seconds) when the number of correction stages is 0 and the blur amount at the shutter speed of 1/15 seconds when the number of correction stages is 2 are equivalent with each other. Until the shutter speed becomes 1/15 second, the influence of the accumulated blur is so small that the EIS gain is not lowered from the reference gain. Thereby, the IS effect of the EIS can be maintained in a wider range. In this way, a range in which the EIS gain is made smaller than the reference gain is changed in accordance with the number of correction stages of the correction optical system 110 (so that the range in which the EIS gain is made smaller than the reference gain when the number of correction stages is large is narrower). Thereby, the IS effect of the EIS can be maintained in a wider range while the blur caused by the accumulated blur is reduced.

Figure 4:
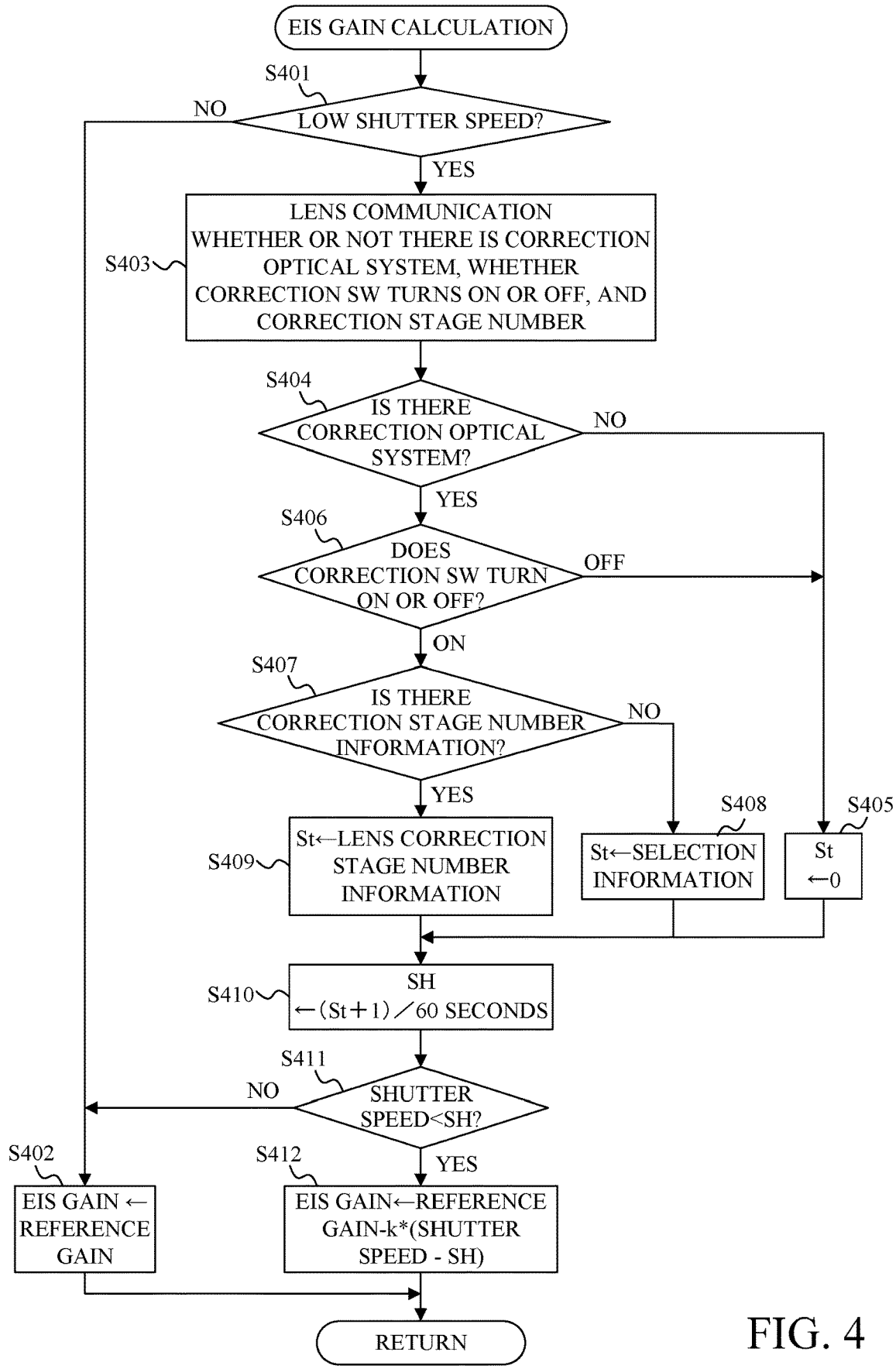
FIG. 4 is a flowchart showing calculation processing of the EIS gain according to the first embodiment.

Referring now to FIG. 4, a description will be given of the EIS gain calculation processing (EIS gain determining method) of the IS amount calculation unit 124. FIG. 4 is a flowchart illustrating the calculation processing of the EIS gain according to this embodiment.

First, in the step S401, the IS amount calculation unit 124 determines whether or not the shutter speed is low (whether or not the shutter speed is lower than the reference shutter speed). This embodiment may determine the reference shutter speed based on the frame rate.

If the shutter speed is not low, the flow proceeds to the step S402, the IS amount calculation unit 124 sets a reference gain as the EIS gain, and the flow ends. If the shutter speed is low in the step S401, the flow proceeds to the step S403. In the step S403, the IS amount calculation unit 124 receives information (lens information) on whether there is the correction optical system, information on whether or not the correction SW turns on or off, and information on the number of correction stages (correction performance) from the lens unit 100 mounted on the camera body 101 by the lens communication.

Next, in the step S404, the IS amount calculation unit 124 determines whether or not the mounted lens unit 100 has the correction optical system 110 based on the received information. If the lens unit 100 does not have the correction optical system 110, the flow proceeds to the step S405. On the other hand, when the lens unit 100 has the correction optical system 110, the flow proceeds to the step S406. In the step S406, the IS amount calculation unit 124 determines whether the correction optical system turns on or off. If the correction optical system 110 turns off, the flow proceeds to the step S405. In the step S405, since the correction optical system 110 is not mounted or the correction optical system 110 turns off, the number of correction stages St is set to 0 by assuming that there is no correction stage by the OIS.

If the correction optical system 110 turns on in the step S406, the flow proceeds to the step S407. In the step S407, the IS amount calculation unit 124 determines whether or not there is information on the number of correction stages of the mounted lens unit 100. If the mounted lens unit 100 has no information on the number of correction stages, that is, if there is no correction stage number information, the flow proceeds to the step S408. Since the number of correction stages is unknown in the step S408, the IS amount calculation unit 124 sets correction stage number information (selection information) selected by the user to the number of correction stages St. Here, the number of correction stages can be input (selected) via an unillustrated input device. The input device includes, but is not limited to, a key input device, a touch panel, a remote controller, and the like. A selection timing may be selected in advance from the menu, or may be selected on a guide screen when the lens unit is attached. If there is no input device, preset default information is selected. If there is information on the number of correction stages of the lens unit in the step S407, the flow proceeds to the step S409. In the step S409, the IS amount calculation unit 124 sets the correction stage number information (lens correction stage number information) acquired from the mounted lens unit 100 to the number of correction stages St.

Next, in the step S410, based on the number of correction stages St set in any of the steps S405, S408, and S409, threshold SH of the shutter speed at which the gain correction is started is calculated using the following expression (1):

$$SH=(St+1)/60 \text{(seconds)} \qquad (1)$$

where 1/60 seconds are the reference shutter speed.

Next, in the step S411, the IS amount calculation unit 124 determines whether or not the shutter speed is lower than the threshold SH. If the shutter speed is not lower than the threshold SH, the flow proceeds to the step S402, and the IS amount calculation unit 124 sets the reference gain to the EIS gain.

If the shutter speed is lower than the threshold SH, the flow proceeds to the step S412. In the step S412, the IS amount calculation unit 124 corrects the EIS gain in the low shutter speed range in accordance with the shutter speed. The EIS gain is calculated according to the following expression (2). The IS amount calculation unit 124 calculates the deviation amount of the shutter speed from the threshold SH (difference between the shutter speed and the threshold SH), gives a correction coefficient k to the calculated deviation amount, and calculates a correction amount (the correction amount of the EIS gain). The IS amount calculation unit 124 sets a value made by subtracting the correction amount from the reference gain to the EIS gain.

$$EIS\ \text{gain} = \text{reference gain} - k \times (\text{shutter speed} - SH) \quad (2)$$

In the expression (2), k is a correction coefficient and tuned so that the object blur caused by the accumulated blur component in the low shutter speed range becomes inconspicuous.

In determining the EIS gain of the EIS, this embodiment sets the shutter speed threshold (reference shutter speed) based on the correction stage number information (correction performance) of the OIS in the low shutter speed range. Then, this embodiment starts correcting the EIS gain at a shutter speed lower than the threshold (reference shutter speed). Therefore, this embodiment can obtain a good IS effect while avoiding the object blur caused by the accumulated blur.

Second Embodiment

Next follows a description of a second embodiment according to the disclosure. The first embodiment changes the threshold (reference shutter speed) of the shutter speed for correcting the EIS gain based on the correction stage number information (correction performance) of the OIS. On the other hand, this embodiment changes the correction amount (change amount) of the EIS gain based on the correction stage number information of the OIS. Thereby, similar to the first embodiment, this embodiment can obtain a good IS effect while avoiding the object blur caused by the accumulated blur. The configuration and operation of the image pickup apparatus in this embodiment are the same as those of the image pickup apparatus 10 in the first embodiment described with reference to FIG. 1, and thus a description thereof will be omitted.

Figure 5:
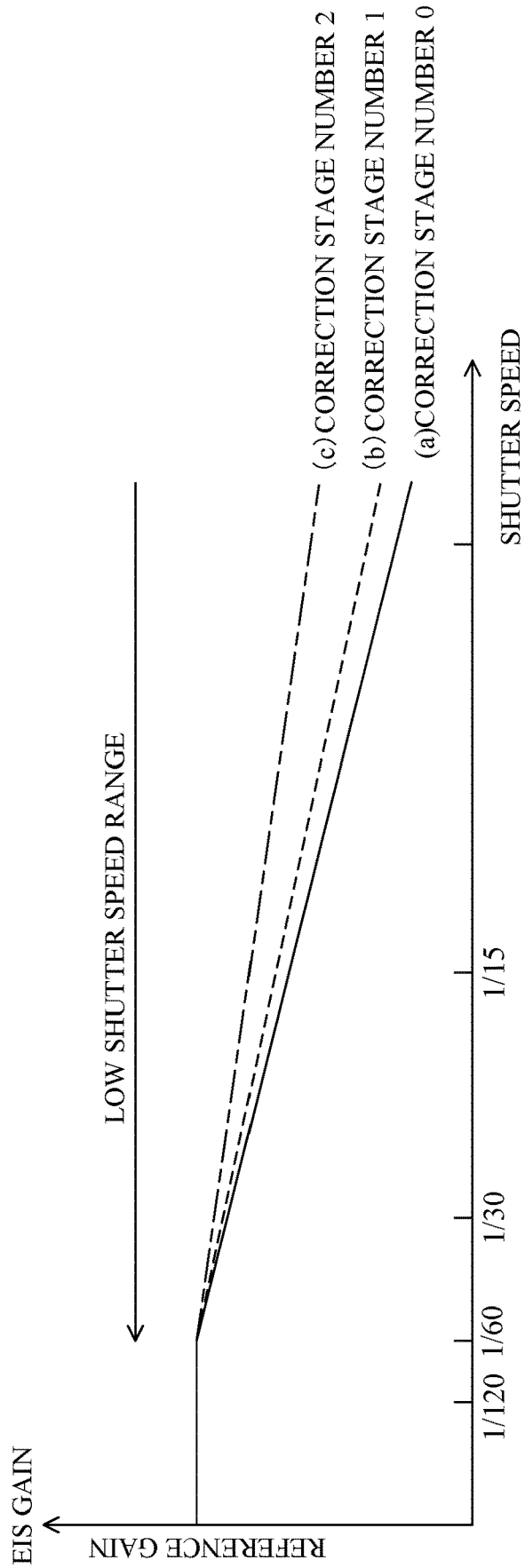
FIG. 5 illustrates a relationship between a shutter speed and an EIS gain in a second embodiment.

FIG. 5 illustrates a relationship between the shutter speed and the correction gain (EIS gain) of the EIS relative to the correction stage number information acquired from the lens unit 100. In FIG. 5, the abscissa axis represents the shutter speed and the ordinate axis represents the EIS gain. In FIG. 5, the frame rate is set to 60 P, the reference shutter speed is set to 1/60 seconds, and the shutter speed lower than the shutter speed of 1/60 seconds is set to the low shutter speed range.

As mentioned above, the accumulated blur at a low shutter speed cannot be corrected by the EIS method. Therefore, when the object position is corrected by the EIS, the accumulated blur component remains, and consequently the object blurs. In order to avoid this situation, as illustrated by a solid line (a) in FIG. 5, the gain (EIS gain) of the EIS is lowered in the low shutter speed range from the reference gain (which is a gain in the normal shutter speed range higher than the shutter speed of 1/60 seconds). By lowering the EIS gain, the correction effect is weakened and the blur can be made inconspicuous. Here, the correction stage number 0 is assumed to have no correction effect of the OIS. In this case, the EIS gain is lowered at a shutter speed of 1/60 seconds or less, which is the low shutter speed range.

A broken line (b) in FIG. 5 illustrates the setting of the EIS gain when the lens unit 100 including the correction optical system 110 having the correction stage number 1 is attached. Since the IS effect of the OIS is maintained up to the lower frequency side by one stage of the shutter speed than that of the correction stage number 0, the accumulated blur in the low shutter speed range is reduced. When the accumulated blur is reduced, the object blur caused by the EIS is reduced. Therefore, the EIS gain can be set to be stronger, and the IS effect can be maintained in a wider range.

An alternate long and short dash line (c) in FIG. 5 illustrates the setting of the EIS gain when the lens unit 100 including the correction optical system 110 having the correction stage number 2 is attached. The IS effect of the OIS is maintained up to the lower frequency side by two stages of the shutter speed than that of the correction stage number 2. Therefore, the accumulated blur in the low shutter speed range becomes smaller than that of the lens having the correction stage number 1. The EIS gain can be set to be stronger than that of the lens having the correction stage number 1, and the IS effect can be maintained in a wider range.

Figure 6:
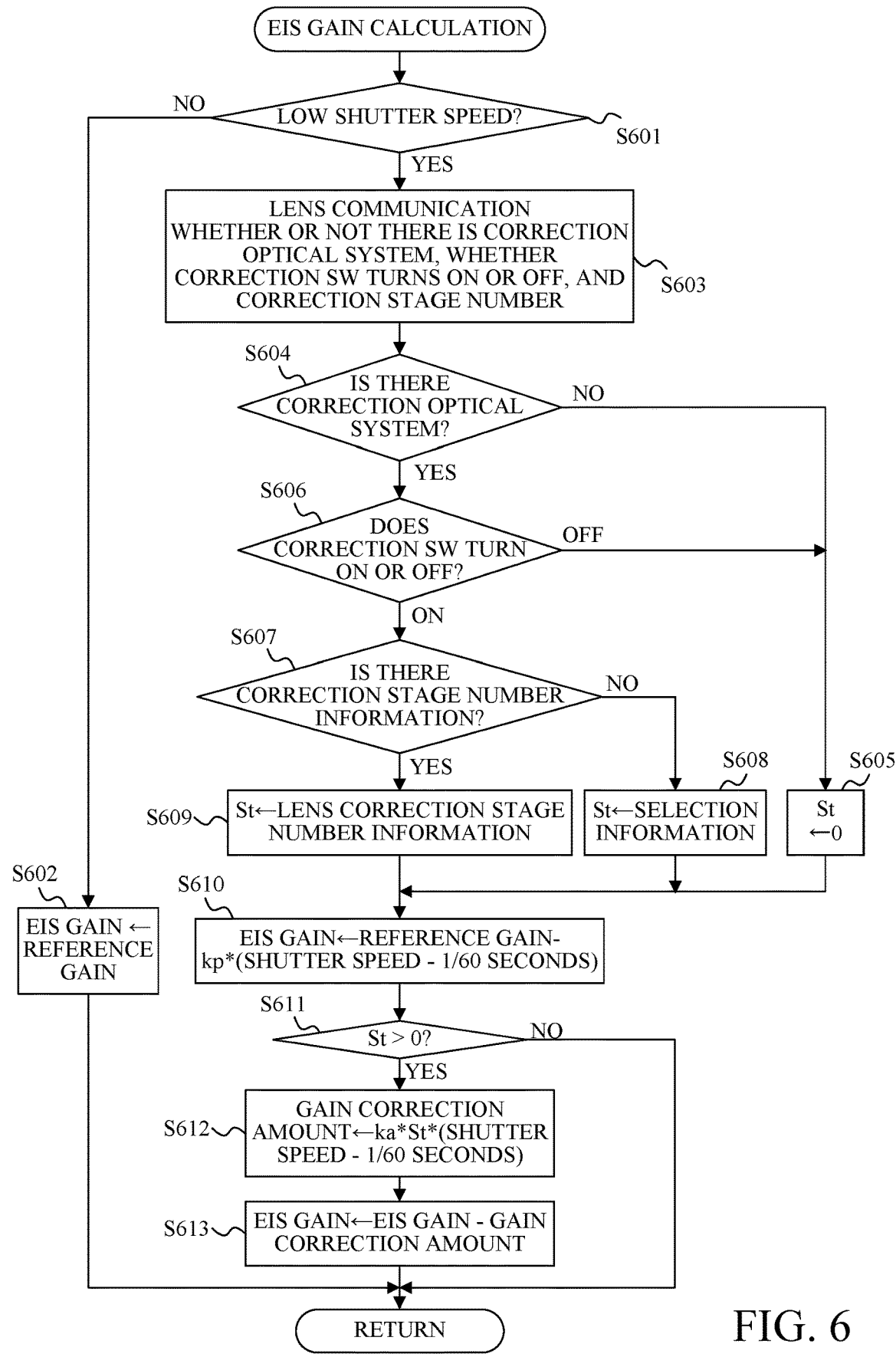
FIG. 6 is a flowchart showing calculation processing of the EIS gain according to the second embodiment.

Referring now to FIG. 6, a description will be given of the EIS gain calculation processing (EIS gain determining method) of the IS amount calculation unit 124. FIG. 6 is a flowchart showing the calculation processing of the EIS gain according to this embodiment. Since the steps S601 to S609 in FIG. 6 are the same as the steps S401 to S409 in FIG. 4, a description thereof will be omitted.

Next, in the step S610, the IS amount calculation unit 124 corrects the EIS gain in the low shutter speed range according to the shutter speed. The corrected EIS gain is calculated by the following expression (3): The correction amount is calculated by giving a correction coefficient kp to a deviation amount of the shutter speed from the reference shutter speed of 1/60 seconds (the difference between the shutter speed and 1/60 seconds), and the value made by subtracting the correction amount from the reference gain is set to the EIS gain.

$$EIS\ \text{gain} = \text{reference gain} - kp \times (\text{shutter speed} - 1/60\ \text{seconds}) \quad (3)$$

In the expression (3), kp is a correction coefficient, and tuned so that the object blur caused by the accumulated blur component in the low shutter speed range becomes inconspicuous.

Next, in the step S611, the IS amount calculation unit 124 determines whether or not the number of correction stages St is larger than 0. If the number of correction stages St is smaller than 0, this flow ends. On the other hand, if the number of correction stages St is larger than 0, the flow proceeds to the step S612. In the step S612, the IS amount calculation unit 124 recalculates the EIS gain correction amount according to the number of correction stages. As expressed by the following expression (4), the gain correction amount is calculated by giving the number of correction stages St and the correction coefficient ka to the deviation amount of the shutter speed from the reference shutter speed of 1/60 seconds (difference between the shutter speed and 1/60 seconds):

$$\text{Gain correction amount} = ka \times St \times (\text{shutter speed} - 1/60\ \text{seconds}) \quad (4)$$

In the expression (4), ka is the correction coefficient, and tuned according to the object blur change caused by the accumulated blur component in the low shutter speed range and the number of correction stages so that the blur becomes inconspicuous and the optimum IS effect is obtained.

Next, in the step S613, the IS amount calculation unit 124 resets the EIS gain according to the number of correction stages using the following expression (5) based on the gain correction amount calculated in the step S612.

$$EIS\ gain = EIS\ gain - gain\ correction\ amount \quad (5)$$

This embodiment changes the correction amount of the EIS gain in the low shutter speed range based on the correction stage number information of the OIS. Therefore, this embodiment can obtain a good IS effect while avoiding the object blur caused by the accumulated blur.

Third Embodiment

Next follows a description of a third embodiment according to the disclosure. The first and second embodiments change the threshold of the shutter speed for correcting the EIS gain or the correction amount of the EIS gain based on the correction stage number information of the OIS. On the other hand, this embodiment detects, as information on the correction performance of the OIS by the correction optical system 110, the remaining correction amount of the OIS, and changes the correction amount of the EIS gain in the low shutter speed range based on the remaining correction amount. Thereby, this embodiment can obtain a good IS effect while avoiding the object blur caused by the accumulated blur. The configuration and operation of the image pickup apparatus according to this embodiment are the same as those of the image pickup apparatus 10 in the first embodiment described with reference to FIG. 1, and thus a description thereof will be omitted.

Figure 7A:
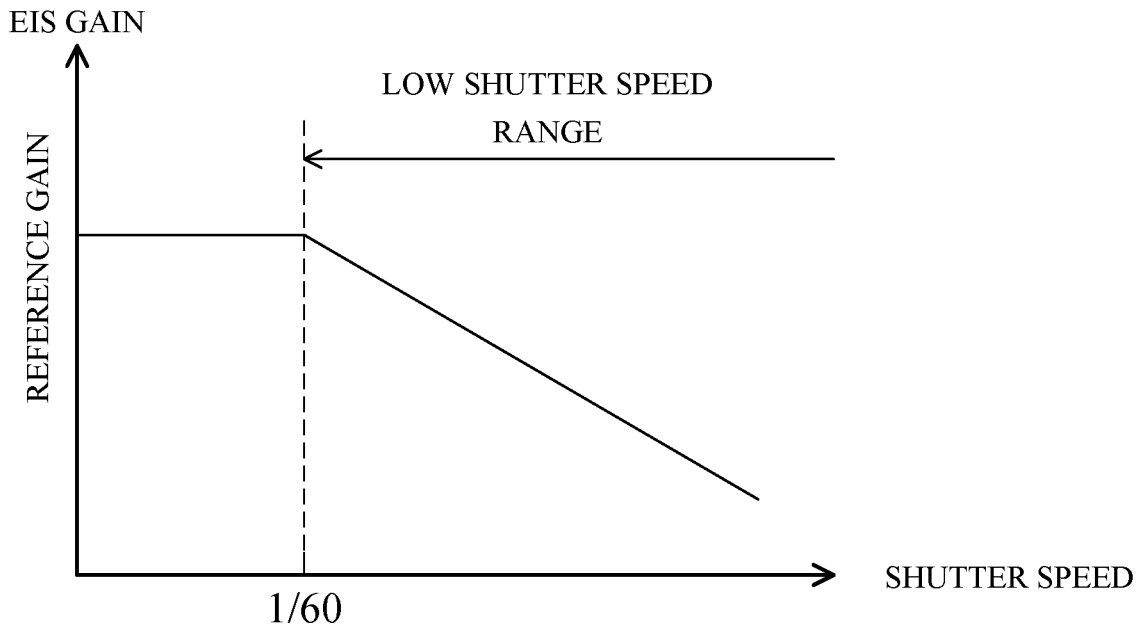
FIGS. 7A and 7B explain a method of correcting an EIS gain according to a third embodiment.
Figure 7B:
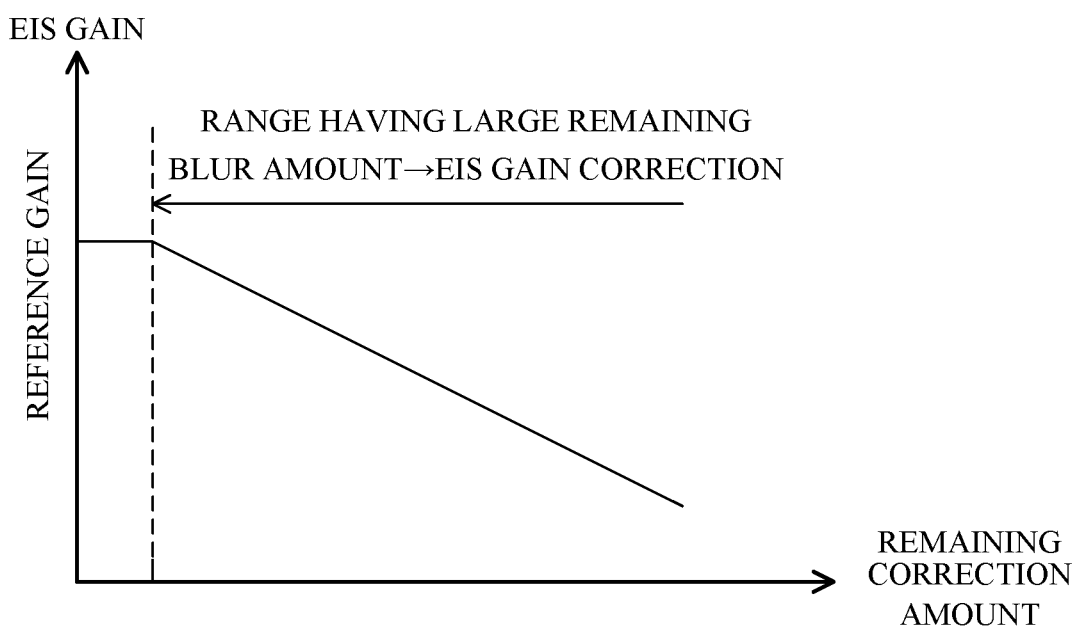

FIGS. 7A and 7B illustrate a method of correcting the EIS gain according to this embodiment. FIG. 7A illustrates a relationship between the shutter speed and the EIS gain. The abscissa axis shows the shutter speed and the ordinate axis shows the EIS gain. In FIG. 7A, the frame rate is set to 60 P, and the shutter speed lower than 1/60 seconds is set to the low shutter speed range accordingly. As the shutter speed becomes lower, the accumulated blur becomes conspicuous. In particular, in the low shutter speed range, the accumulated blur becomes remarkable, so that the object blur caused by the EIS becomes an issue. In order to reduce this blur, a correction is made in the direction of lowering the EIS gain in the low shutter speed range. Since the method of correcting the EIS gain is the same as that in the first and second embodiments, a description thereof will be omitted.

FIG. 7B illustrates a relationship between the remaining correction amount (remaining blur amount) of the OIS by the correction optical system 110 and the gain (EIS gain) of the EIS. The abscissa axis shows the remaining correction amount, and the ordinate axis shows the EIS gain. The accumulated blur amount can be known from the remaining blur amount of the OIS. As the remaining blur amount of the OIS becomes larger, the magnitude of the remaining blur amount appears as the accumulated blur amount in the low shutter speed range. For the reason described above, the EIS gain cannot be increased. Thus, this embodiment makes a correction in the direction of lowering the EIS gain according to the remaining correction amount to avoid the influence of the accumulated blur.

Figure 8:
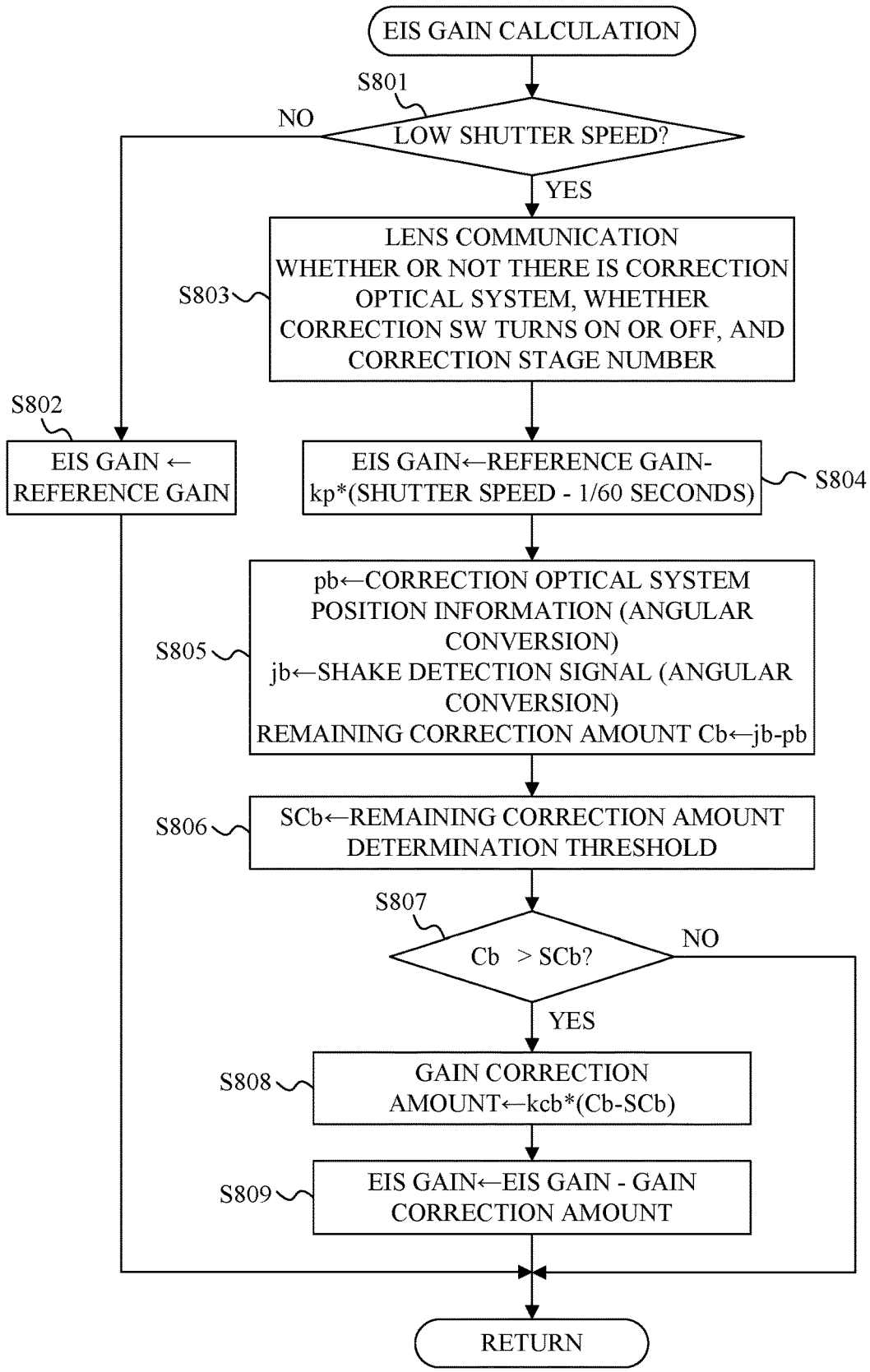
FIG. 8 is a flowchart showing calculation processing of an EIS gain according to the third embodiment.

Referring now to FIG. 8, a description will be given of the EIS gain calculation processing (EIS gain determining method) of the IS amount calculation unit 124. FIG. 8 is a flowchart showing the calculation processing of the EIS gain according to this embodiment.

First, in the step S801, the IS amount calculation unit 124 determines whether or not the shutter speed is low. If the shutter speed is not low, the flow proceeds to the step S802, the IS amount calculation unit 124 sets a reference gain to the EIS gain, and ends this flow. On the other hand, if the shutter speed is low, the flow proceeds to the step S803. In the step S803, the IS amount calculation unit 124 receives the position information and the shake detection information of the correction optical system from the lens unit 100 mounted on the camera body 101 by the lens communication.

Next, in the step S804, the IS amount calculation unit 124 corrects the EIS gain in the low shutter speed range according to the shutter speed. The corrected EIS gain is calculated by the following expression (6): The correction amount is calculated by giving the correction coefficient kp to the deviation amount of the shutter speed from the reference shutter speed of 1/60 seconds (difference between the shutter speed and 1/60 seconds), and the value made by subtracting the correction amount from the reference gain is set to the EIS gain.

$$EIS\ gain = reference\ gain - kp \times (shutter\ speed - 1/60\ seconds) \quad (6)$$

In the expression (6), kp is a correction coefficient, and tuned so that the object blurs caused by the accumulated blur component in the low shutter speed range becomes inconspicuous.

Next, in the step S805, the IS amount calculation unit 124 converts the position information of the correction optical system received from the lens unit 100 into an angle based on the current focal length, and sets it as correction optical system position information pb. The IS amount calculation unit 124 integrates the shake detection information on the angular velocity of the vibration gyro obtained from the shake detection sensor 102 into an angle, and sets it as a shake detection signal (shake detection information) jb. A difference between the shake detection signal jb and the correction optical system position information pb is calculated as the remaining correction amount Cb. This embodiment uses the shake detection information acquired from the shake detection sensor 102, which is a component of the lens unit 100, but the disclosure is not limited to this embodiment. For example, when the camera body 101 is equipped with the shake detection sensor (shake detection unit), the shake detection sensor in the camera body 101 may be used. That is, the shake detection information acquired from the shake detection unit provided in at least one of the lens unit 100 and the camera body 101 can be used.

Next, in the step S806, the IS amount calculation unit 124 sets remaining correction amount determination threshold SCb as a predetermined threshold. In this embodiment, the remaining correction amount determination threshold SCb may be changed based on the shutter speed. Since the accumulated blur becomes more remarkable as the shutter speed is lower, the remaining correction amount determination threshold SCb may be set smaller as the shutter speed is lower.

Next, in the step S807, the IS amount calculation unit 124 determines whether or not the remaining correction amount Cb exceeds the remaining correction amount determination threshold SCb. If the remaining correction amount Cb does not exceed the remaining correction amount determination threshold SCb, this flow ends. On the other hand, when the remaining correction amount Cb exceeds the remaining correction amount determination threshold SCb, the flow proceeds to the step S808, and the IS amount calculation unit 124 calculates the gain correction amount. The gain correction amount is calculated by the following expression (7). That is, the gain correction amount is calculated by giving a correction coefficient kCb to a difference between the remaining correction amount Cb and the remaining correction amount determination threshold SCb.

$$\text{Gain correction amount} = kCb \times (Cb - SCb) \quad (7)$$

In the expression (7), kCb is a correction coefficient, and tuned so that the object blur caused by the accumulated blur component in the low shutter speed range becomes inconspicuous.

Next, in the step S809, the IS amount calculation unit 124 resets the EIS gain in accordance with the remaining correction amount Cb using the following expression (8) based on the gain correction amount calculated in the step S808.

$$\text{EIS gain} = \text{EIS gain} - \text{gain correction amount} \quad (8)$$

This embodiment changes the correction amount of the EIS gain in the low shutter speed range based on the remaining correction amount of the OIS. Therefore, this embodiment can obtain a good IS effect while avoiding the object blur caused by the accumulated blur.

As described above, in each embodiment, the control apparatus (IS amount calculation unit 124) includes an acquisition unit 124a configured to acquire information on the OIS performance and a shutter speed and a correction unit 124b configured to provide the EIS. The correction unit changes the gain of the correction unit based on information on a shutter speed and the information on the IS performance.

The correction unit may change the gain when the shutter speed is lower than a reference shutter speed. The correction unit may set the gain to a first gain when the shutter speed is a first shutter speed and set the gain to a second gain lower than the first gain when the shutter speed is a second shutter speed lower than the first shutter speed.

The correction unit may set the gain to a third gain when the IS performance is a first IS performance, and set the gain to a fourth gain when the IS performance is a second IS performance higher than the first IS performance. The correction unit may set a reference shutter speed to a first shutter speed when the IS performance is the first IS performance. On the other hand, when the IS performance is the second IS performance, the correction unit may set the reference shutter speed to a second shutter speed lower than the first shutter speed (FIG. 3). When the IS performance is the first IS performance, the correction unit may change the gain by a first change amount with a change of the shutter speed. On the other hand, when the IS performance is the second IS performance, the correction unit changes the gain by a second change amount smaller than the first change amount with a change of the shutter speed (FIG. 5).

The information on the IS performance may be information on the number of correction stages for maintaining the IS performance at the shutter speed, or information on the remaining correction amount of the correction optical system 110 of the lens unit 100. The remaining correction amount may be calculated based on the shake detection information acquired from the shake detection unit (shake detection sensor 102) and information on a correction position of the correction optical system 110. The shake detection unit may be provided in at least one of the image pickup apparatus (camera body 101) and the lens apparatus (lens unit 100). When the remaining correction amount exceeds a predetermined threshold (remaining correction amount determination threshold SCb), the correction unit may change the gain, and the predetermined threshold may be changed based on the shutter speed.

The acquisition unit may acquire information indicating whether or not the lens apparatus mounted on the image pickup apparatus has a correction optical system that performs the OIS. The correction unit may set the gain to a value when the lens apparatus has the correction optical system larger than that when the lens apparatus has no correction optical system (S404, S604). The acquisition unit may acquire information indicating whether the correction optical system in the lens apparatus mounted on the image pickup apparatus turns on or off. The correction unit may set the gain to a value when the correction optical system turns off larger than that when the correction optical system turns on (S406, S606).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a control apparatus, an image pickup apparatus, a control method, and a storage medium, each of which can provide a good IS while reducing the influence of the accumulated blur even at a low shutter speed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, each embodiment exemplarily sets the frame rate to 60 P and 1/60 (seconds) corresponding to 60 P to a reference shutter speed, but the reference shutter speed is not limited to this example and may be determined according to the frame rate. An image pickup apparatus capable of changing the frame rate may change the reference shutter speed according to the frame rate. The reference shutter speed may not deviate greatly from the frame rate, but it does not necessarily have to be equal to the frame rate.

This application claims the benefit of Japanese Patent Application No. 2020-109031, filed on Jun. 24, 2020, which is hereby incorporated by reference herein in its entirety.

What is claimed is:

1. A control apparatus comprising:
at least one processor; and
a memory coupled to the at least one processor, the memory having instructions that, when executed by the at least processor, performs operations as:
an acquisition unit configured to acquire information indicating an evaluation value of performance of a stabilization; and
a correction unit configured to provide an image stabilization, wherein the correction unit changes a gain of the correction unit based on information on a shutter speed and the information indicating the evaluation value of the performance of the stabilization.

2. The control apparatus according to claim 1, wherein the correction unit changes the gain when the shutter speed is lower than a reference shutter speed.

3. The control apparatus according to claim 2, wherein the reference shutter speed is determined based on a frame rate.

4. The control apparatus according to claim 2, wherein the correction unit sets the gain to a first gain when the shutter speed is a first shutter speed, and sets the gain to a second gain smaller than the first gain when the shutter speed is a second shutter speed lower than the first shutter speed.

5. The control apparatus according to claim 2, wherein the correction unit sets the gain to a third gain when the evaluation value of the performance of the stabilization is a first stabilization performance, and sets the gain to a fourth gain larger than the third gain when the evaluation value of the performance of the stabilization is a second stabilization performance higher than the first stabilization performance.

6. The control apparatus according to claim 5, wherein the correction unit sets the reference shutter speed to the first shutter speed when the stabilization performance is the first stabilization performance, and sets the reference shutter speed to a second shutter speed lower than the first shutter speed when the stabilization performance is the second stabilization performance.

7. The control apparatus according to claim 5, wherein the correction unit changes the gain by a first change amount with a change of the shutter speed when the stabilization performance is the first stabilization performance, and changes the gain by a second change amount smaller than the first change amount with the change of the shutter speed when the stabilization performance is the second stabilization performance.

8. The control apparatus according to claim 5, wherein the information indicating the evaluation value of the performance of the stabilization is information indicating the evaluation value of the performance of the stabilization of a lens apparatus,
wherein the correction unit provides the image stabilization by adjusting an image read range output from a sensor, and
wherein the correction unit sets the gain to the third gain when the evaluation value of the performance of the stabilization is the first stabilization performance, and sets the gain to the fourth gain when the evaluation value of the performance of the stabilization is the second stabilization performance to weaken an effect of the image stabilization by the correction unit in a case where the evaluation value of the performance of the stabilization is the first stabilization performance compared to a case where the evaluation value of the performance of the stabilization is the second stabilization performance.

9. The control apparatus according to claim 1, wherein the information indicating the evaluation value of the performance of the stabilization is information on a number of correction stages configured to maintain the stabilization performance at the shutter speed.

10. The control apparatus according to claim 1, wherein the information indicating the evaluation value of the performance of the stabilization is information on a remaining correction amount of a correction system configured to provide an image stabilization, in a lens apparatus.

11. The control apparatus according to claim 10, wherein the remaining correction amount is calculated based on shake detection information acquired from a sensor and information on a correction position of the correction system.

12. The control apparatus according to claim 11, wherein the detection unit is included in at least one of a pickup apparatus and the lens apparatus.

13. The control apparatus according to claim 10, wherein when the remaining correction amount exceeds a predetermined threshold, the correction unit changes the gain, and
wherein the predetermined threshold changes based on the shutter speed.

14. The control apparatus according to claim 1, wherein the correction unit provides the image stabilization by adjusting an image read range output from a sensor.

15. The control apparatus according to claim 1, wherein an effect of the image stabilization by the correction unit is weakened by lowering the gain.

16. An image pickup apparatus comprising:
a sensor; and
a control apparatus,
wherein the control apparatus includes:
at least one processor; and
a memory coupled to the at least one processor, the memory having instructions that, when executed by the at least processor, performs operations as:
an acquisition unit configured to acquire information indicating an evaluation value of performance of a stabilization; and
a correction unit configured to provide an image stabilization, wherein the correction unit changes a gain of the correction unit based on information on a shutter speed and information indicating the evaluation value of the performance of the stabilization.

17. The image pickup apparatus according to claim 16, wherein the at least one processor further performs operations as:
a communication unit configured to communicate with a lens apparatus, the lens apparatus being attachable to and detachable from the image pickup apparatus,
wherein the acquisition unit acquires the information indicating the evaluation value of the performance of the stabilization from the lens apparatus via the communication unit.

18. The image pickup apparatus according to claim 17, wherein the acquisition unit acquires information indicating whether or not the lens apparatus attached to the image pickup apparatus includes a correction system configured to provide an image stabilization, and
wherein the correction unit sets the gain to a value when the lens apparatus includes the correction system, larger than that when the lens apparatus does not include the correction system.

19. The image pickup apparatus according to claim 17, wherein the acquisition unit acquires information indicating whether or not a correction system in the lens apparatus attached to the image pickup apparatus provides an image stabilization, and wherein the correction unit sets the gain to a value when the correction system provides the image stabilization, which is larger than that when the correction system does not provide the image stabilization.

20. A control method comprising:

acquiring information indicating an evaluation value of performance of a stabilization;

providing an image stabilization using a correction unit; and changing a gain of the correction unit based on information on a shutter speed and information indicating the evaluation value of the performance of the stabilization.

21. A non-transitory computer-readable storage medium storing a computer program that causes a computer to execute the control method, the method comprising:

acquiring information indicating an evaluation value of performance of a stabilization;

providing an image stabilization using a correction unit; and changing a gain of the correction unit based on information on a shutter speed and information indicating the evaluation value of the performance of the stabilization.

* * * * *